US012665222B2

(12) United States Patent
Wang et al.

(10) Patent No.: US 12,665,222 B2
(45) Date of Patent: Jun. 23, 2026

(54) ELECTROLYTES COMPRISING TRIALKYLSILYL PHOSPHORUS ESTER ADDITIVES

(71) Applicant: GM GLOBAL TECHNOLOGY OPERATIONS LLC, Detroit, MI (US)

(72) Inventors: Chuanlong Wang, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 613 days.

(21) Appl. No.: 18/124,241

(22) Filed: Mar. 21, 2023

(65) Prior Publication Data

US 2024/0322235 A1 Sep. 26, 2024

(51) Int. Cl.

| | |
|---|---|
| ***H01M 10/0567*** | (2010.01) |
| ***H01M 4/62*** | (2006.01) |
| ***H01M 10/0569*** | (2010.01) |

(52) U.S. Cl.

CPC ....... *H01M 10/0567* (2013.01); *H01M 4/628* (2013.01); *H01M 10/0569* (2013.01); *H01M 2300/0037* (2013.01)

(58) Field of Classification Search

CPC ........... H01M 8/1072; H01M 10/0567; H01M 10/0569; H01M 4/628; H01M 2300/0037; H01M 2300/0025

See application file for complete search history.

(56) References Cited

U.S. PATENT DOCUMENTS

| | | | | |
|---|---|---|---|---|
| 2021/0075011 | A1* | 3/2021 | Lim | H01M 10/0567 |
| 2021/0344037 | A1* | 11/2021 | He | H01M 10/0569 |
| 2022/0149433 | A1* | 5/2022 | Hidaka | C07F 9/09 |
| 2024/0079652 | A1* | 3/2024 | Qian | H01M 10/0567 |
| 2024/0132269 | A1* | 4/2024 | Hoshi | H01M 4/0404 |
| 2025/0105354 | A1* | 3/2025 | Huang | H01M 10/4235 |

OTHER PUBLICATIONS

CN 110265717 A, Zhan et al, Sep. 20, 2019 and machine translation (Year: 2019).*

CN 110265717 A, Zhan et al., Sep. 20, 2019 and machine translation (Year: 2019) (Year: 2019).*

Taeeun Yim, Tris(trimethylsilyl) Phosphite as an Efficient Electrolyte Additive To Improve the Surface Stability of Graphite Anodes, ACS Appl. Mater. Interfaces, 2017, vol. 9, pp. 32851-32858.

(Continued)

*Primary Examiner* — Galen H Hauth
*Assistant Examiner* — Hunsuyador Mugeesatu Yusif

(57) ABSTRACT

An electrolyte for an electrochemical cell that cycles lithium ions includes an organic solvent, an inorganic lithium salt, and an additive including a chemical compound having a phosphorus, oxygen, and silicon bond (POS additive). The organic solvent includes a mixture of a cyclic carbonate and a linear carbonate. The POS additive includes a trialkylsilyl ester of at least one of phosphoric acid, polyphosphoric acid, phosphonic acid, and phosphorous acid. The electrochemical cell may include a positive electrode comprising a nickel-based electroactive material and a negative electrode comprising a silicon-based electroactive active material.

20 Claims, 1 Drawing Sheet

(56) References Cited

OTHER PUBLICATIONS

Haidong Liu, Understanding the Roles of Tris(trimethylsilyl) Phosphite (TMSPi) in LINI0.8Mn0.1Co0.1O2 (NMC811)/Silicon-Graphite (Si—Gr) Lithium-Ion Batteries, Adv. Mater. Interfaces, 2020, 7, 2000277.
Shaowei Mai, Tris(trimethylsilyl)phosphite as electrolyte additive for high voltage layered lithium nickel cobalt manganese oxide cathode of lithium ion battery, Electrochimica Acta, 2014, vol. 147, pp. 565-571.
U.S. Appl. No. 17/841,250, Inventors: Chuanlong Wang, et al., Electrolyte Additive for Nickel-Rich Cathodes and Silicon-Containing Anodes, filed Jun. 15, 2022.
U.S. Appl. No. 17/901,298, Inventors: Chuanlong Wang, et al., Electrolytes for Electrochemical Cells That Cycle Lithium Ions, Filed Sep. 1, 2022.
U.S. Appl. No. 17/586,035, Chuanlong Wang, et al., Electrolyte Composition for Batteries, Filed Jan. 27, 2022.

* cited by examiner

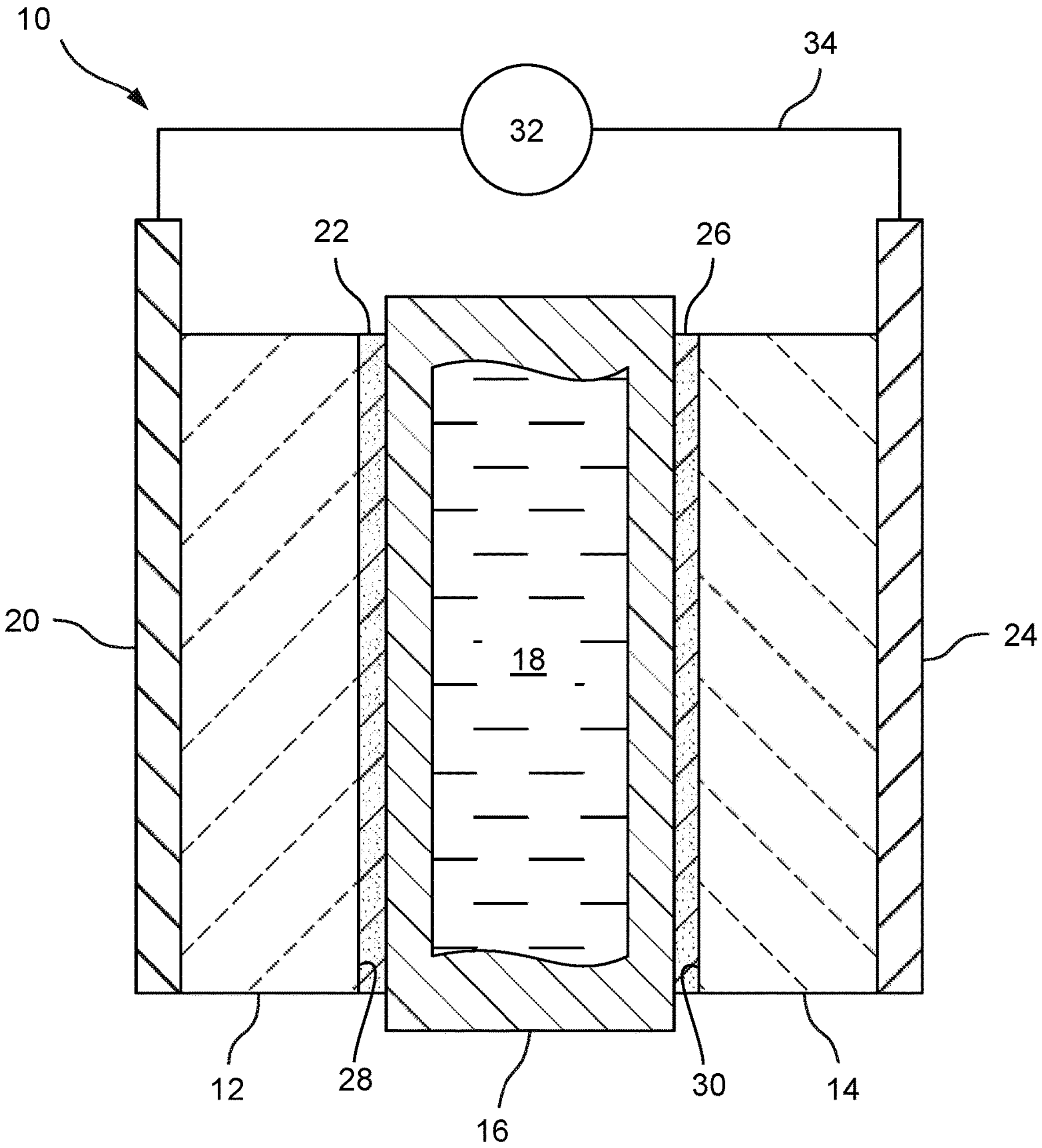
10
34
32
22
26
20
24
18
12
28
16
30
14

ELECTROLYTES COMPRISING TRIALKYLSILYL PHOSPHORUS ESTER ADDITIVES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electrolytes for electrochemical cells that cycle lithium ions, and more particularly to additives for electrolytes that facilitate the formation of protective interphase layers on surfaces of the positive electrode and/or the negative electrode.

Electrochemical cells that cycle lithium ions generally include a positive electrode, a negative electrode spaced apart from the positive electrode, and an ionically conductive electrolyte that provides a medium for the conduction of lithium ions between the positive and negative electrodes during discharge and charge of the electrochemical cell. The electrolyte may be formulated to exhibit certain desirable properties including high ionic conductivity, high dielectric constant (correlated with a high ability to dissolve salts), good thermal stability, a wide electrochemical stability window, ability to form a stable ionically conductive solid electrolyte interface (SEI) on the surface of the positive electrode and/or the negative electrode, and chemical compatibility with other components of the electrochemical cell.

SUMMARY

An electrolyte for an electrochemical cell that cycles lithium ions comprises an organic solvent, an inorganic lithium salt in the organic solvent, and an additive comprising a chemical compound having a phosphorus, oxygen, and silicon bond (POS additive). The organic solvent comprises a mixture of a cyclic carbonate and a linear carbonate. The POS additive comprises a trialkylsilyl ester of at least one of phosphoric acid, polyphosphoric acid, phosphonic acid, and phosphorous acid.

The POS additive may comprise tris(trimethylsilyl)phosphite, tris(trimethylsilyl)phosphate, bis(trimethylsilyl) phosphite, trimethylsilyl polyphosphate, or a combination thereof. The POS additive may constitute, by weight, greater than or equal to about 0.2% to less than or equal to about 1.5% of the electrolyte.

The organic solvent may comprise a mixture of ethylene carbonate and dimethyl carbonate. In such case, the organic solvent may constitute, by weight, greater than or equal to about 70% to less than or equal to about 90% of the electrolyte. A ratio of the ethylene carbonate to the dimethyl carbonate in the organic solvent may be greater than or equal to about 2 to 8 to less than or equal to about 4 to 6.

The inorganic lithium salt may comprise lithium hexafluorophosphate. In such case, the inorganic lithium salt may constitute, by weight, greater than or equal to about 5% to less than or equal to about 20% of the electrolyte.

The electrolyte may further comprise a carbonate additive selected from the group consisting of fluoroethylene carbonate, vinylene carbonate, and combinations thereof.

In aspects, the carbonate additive may comprise the fluoroethylene carbonate and the vinylene carbonate. In such case, the fluoroethylene carbonate may constitute, by weight, greater than or equal to about 1% to less than or equal to about 3% of the electrolyte and the vinylene carbonate may constitute, by weight, greater than or equal to about 0.5% to less than or equal to about 1.5% of the electrolyte.

An electrochemical cell that cycles lithium ions comprises a positive electrode, a negative electrode, a porous separator sandwiched between the positive electrode and the negative electrode, and an organic solvent. The positive electrode comprises a nickel-based electroactive material and the negative electrode comprises a silicon-based electroactive active material. The electrolyte infiltrates at least one of the positive electrode, the negative electrode, and the porous separator. The electrolyte comprises an organic solvent, an inorganic lithium salt in the organic solvent, and an additive comprising a chemical compound having a phosphorus, oxygen, and silicon bond (POS additive). The organic solvent comprises a mixture of a cyclic carbonate and a linear carbonate. The POS additive comprises a trialkylsilyl ester of at least one of phosphoric acid, polyphosphoric acid, phosphonic acid, and phosphorous acid.

The POS additive may comprise tris(trimethylsilyl)phosphite, tris(trimethylsilyl)phosphate, bis(trimethylsilyl) phosphite, trimethylsilyl polyphosphate, or a combination thereof. The POS additive may constitute, by weight, greater than or equal to about 0.2% to less than or equal to about 1.5% of the electrolyte.

The electrochemical may further comprise a first interphase layer disposed on a major surface of the positive electrode and a second interphase layer disposed on a major surface of the negative electrode. The first interphase layer and the second interphase layer may be respectively formed in situ on the major surfaces of the positive electrode and the negative electrode during cycling of the electrochemical cell.

The first interphase layer and the second interphase layer each may comprise a chemical compound having a phosphorus, oxygen, and silicon bond (P—O—Si bond).

Electrochemical oxidation of the POS additive may occur at the positive electrode during charge of the electrochemical cell and the first interphase layer may comprises byproducts of the electrochemical oxidation of the POS additive.

The organic solvent may comprise a mixture of ethylene carbonate and dimethyl carbonate.

Intermediate chemical compounds may be formed within the electrochemical cell via electrochemical reduction of the ethylene carbonate at the negative electrode during cycling of the electrochemical cell. In such case, the second interphase layer may comprise byproducts of chemical reactions between the intermediate chemical compounds and the POS additive.

The organic solvent may constitute, by weight, greater than or equal to about 70% to less than or equal to about 90% of the electrolyte. A ratio of the ethylene carbonate to the dimethyl carbonate in the organic solvent may be greater than or equal to about 2 to 8 to less than or equal to about 4 to 6.

The inorganic lithium salt may comprise lithium hexafluorophosphate. The inorganic lithium salt may constitute, by weight, greater than or equal to about 5% to less than or equal to about 20% of the electrolyte.

The nickel-based electroactive material may comprise lithium nickel cobalt manganese aluminum oxide, lithium nickel manganese cobalt oxide, lithium nickel cobalt aluminum oxide, or a combination thereof. The positive electrode may comprise, by weight, greater than 80% nickel.

The silicon-based electroactive material may comprise silicon, silicon oxide, lithium silicon oxide, or a combination thereof. The negative electrode may comprise, by weight, greater than 5% silicon.

The electrolyte may further comprise a carbonate additive selected from the group consisting of fluoroethylene carbonate, vinylene carbonate, and combinations thereof.

The carbonate additive may comprise the fluoroethylene carbonate and the vinylene carbonate. In such case, the fluoroethylene carbonate may constitute, by weight, greater than or equal to about 1% to less than or equal to about 3% of the electrolyte and the vinylene carbonate may constitute, by weight, greater than or equal to about 0.5% to less than or equal to about 1.5% of the electrolyte.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a schematic cross-sectional view of an electrochemical cell that cycles lithium ions, the electrochemical cell comprises a positive electrode, a negative electrode, a porous separator, and an electrolyte infiltrating the open pores of at least one of the positive and negative electrodes and the porous separator.

In the drawings, reference numbers may be reused to identify similar and/or identical elements.

DETAILED DESCRIPTION

The presently disclosed electrolyte is formulated for use in electrochemical cells that cycle lithium ions to promote the formation of protective interphase layers on surfaces of the positive and negative electrodes, which may help improve the cycling stability and capacity retention of the electrochemical cells. The electrolyte may comprise an organic solvent mixture (e.g., a mixture of ethylene carbonate and dimethyl carbonate), an inorganic lithium salt (e.g., $LiPF_6$), an additive comprising a chemical compound having a phosphorus, oxygen, and silicon bond (P—O—Si bond) (a POS additive), and optionally one or more carbonate additives (e.g., fluoroethylene carbonate and/or vinylene carbonate). Inclusion of the POS additive in the electrolyte may promote the formation of robust protective interphase layers on surfaces of the positive and negative electrodes, which may prevent undesirable chemical reactions from occurring between the positive and negative electrodes and the electrolyte during cycling of the electrochemical cells. In addition, the protective interphase layers may exhibit high lithium ion conductively and may help improve the cycling stability of the electrochemical cells, for example, by suppressing decomposition of other components of the electrolyte without inhibiting the free flow of lithium ions through the electrochemical cells. Use of the presently disclosed electrolyte in electrochemical cells that comprise nickel-based positive electrodes and silicon-containing negative electrodes may be particularly beneficial.

FIG. 1 depicts a schematic side cross-sectional view of an electrochemical cell 10 that cycles lithium ions. The electrochemical cell 10 comprises a positive electrode 12, a negative electrode 14, a porous separator 16, and an electrolyte 18. The positive electrode 12 is disposed on a major surface of a positive electrode current collector 20 and the negative electrode 14 is disposed on a major surface of a negative electrode current collector 24. The positive electrode 12 includes a first interphase layer 22 disposed on a major surface 28 thereof along an interface between the positive electrode 12 and the porous separator 16. The negative electrode 14 includes a second interphase layer 26 disposed on a major surface 30 thereof along an interface between the negative electrode 14 and the porous separator 16. In practice, the positive and negative electrode current collectors 20, 24 may be electrically coupled to a power source or load 32 via an external circuit 34.

The electrochemical cell 10 may be used in secondary lithium-ion batteries for vehicle or automotive transportation applications (e.g., motorcycles, boats, tractors, buses, motorcycles, mobile homes, campers, and tanks), as well as in a wide variety of other industries and applications, including aerospace components, consumer products, devices, buildings (e.g., houses, offices, sheds, and warehouses), office equipment and furniture, and industrial equipment machinery, agricultural or farm equipment, or heavy machinery, by way of non-limiting example. In certain aspects, the electrochemical cell 10 may be used in secondary lithium-ion batteries for Hybrid Electric Vehicles (HEVs) and/or Electric Vehicles (EVs).

The positive electrode 12 is configured to store and release lithium ions during discharge and charge of the electrochemical cell 10. The positive electrode 12 may be in the form of a continuous porous layer disposed on the major surface of the positive electrode current collector 20. The positive electrode 12 may include one or more electrochemically active (electroactive) materials that can undergo a reversible redox reaction with lithium at a higher electrochemical potential than the electroactive material of the negative electrode 14 such that an electrochemical potential difference exists between the positive and negative electrodes 12, 14. For example, the electroactive material of the positive electrode 12 may comprise a material that can undergo lithium intercalation and deintercalation or can undergo a conversion by reaction with lithium. In aspects, the electroactive material of the positive electrode 12 may comprise an intercalation host material that can undergo the reversible insertion or intercalation of lithium ions. In such case, the electroactive material of the positive electrode 12 may comprise a layered oxide represented by the formula $LiMeO_2$, an olivine-type oxide represented by the formula $LiMePO_4$, a monoclinic-type oxide represented by the formula $LisMe_2(PO_4)_3$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In aspects, the electroactive material of the positive electrode 12 may comprise lithium manganese iron phosphate (LMFP), e.g., $LiMn_{0.7}Fe_{0.3}PO_4$, lithium iron phosphate (LFP), lithium manganese oxide (LMO), e.g., $LiMn_2O_4$, and combinations thereof.

In aspects, the electroactive material of the positive electrode 12 may comprise a nickel-based material, meaning nickel (Ni) is the single largest constituent of the electroactive material on a weight percentage (%) basis. This may include electroactive materials having, by weight, greater than 50% nickel, as well as those having, by weight, less than 50% nickel, so long as nickel is the single largest constituent of the electroactive material based upon its overall weight. In aspects, the electroactive material of the positive electrode 12 may comprise, by weight, greater than or equal to about 50%, optionally about 60%, optionally about 70%, optionally about 80%, or optionally about 85% nickel. Examples of nickel-based electroactive materials include lithium nickel cobalt manganese aluminum oxide (NCMA), lithium nickel manganese cobalt oxide (NMC), lithium nickel cobalt aluminum oxide (NCA), and combinations thereof.

The electroactive material of the positive electrode 12 may be a particulate material and particles of the electroactive material of the positive electrode 12 may be intermingled with a polymer binder, for example, to provide the positive electrode 12 with structural integrity. Examples of polymer binders include polyvinylidene fluoride (PVDF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), styrene ethylene butylene styrene copolymer (SEBS), polyacrylates, alginates, polyacrylic acid, and combinations thereof. In aspects, the positive electrode 12 may comprise a polymer binder comprising polyvinylidene fluoride.

The positive electrode 12 optionally may include particles of an electrically conductive material. Examples of electrically conductive materials include carbon-based materials, metals (e.g., nickel), and/or electrically conductive polymers. Examples of electrically conductive carbon-based materials include carbon black (CB) (e.g., acetylene black), graphite, graphene (e.g., graphene nanoplatelets, GNP), graphene oxide, carbon nanotubes (CNT), and/or carbon fibers (e.g., carbon nanofibers). Examples of electrically conductive polymers include polyaniline, polythiophene, polyacetylene, and/or polypyrrole. In aspects, the positive electrode 12 may comprise an electrically conductive material comprising a mixture of carbon nanotubes, carbon black, and graphene nanoplatelets.

The negative electrode 14 is configured to store and release lithium ions during charge and discharge of the electrochemical cell 10. The negative electrode 14 may be in the form of a continuous porous layer of material disposed on a major surface of the negative electrode current collector 24. The negative electrode 12 is configured to store and release lithium ions to facilitate charge and discharge, respectively, of the electrochemical cell 10. To accomplish this, the negative electrode 14 includes one or more electrochemically active (electroactive) materials that can facilitate the storage and release of lithium ions by undergoing a reversible redox reaction with lithium during charge and discharge of the electrochemical cell 10. At least one of the electroactive materials of the negative electrode 14 is a silicon-based material. As an electroactive material, silicon (Si) can facilitate the storage of lithium in the negative electrode 14 during charging of the electrochemical cell 10 by forming an alloy with lithium (lithiation) and, during discharge of the electrochemical cell 10, lithium ions can be released from the negative electrode 14 by dealloying from silicon (delithiation).

The term "silicon-based," as used herein with respect to the electroactive material of the negative electrode 14, broadly includes materials in which silicon is the single largest constituent on a weight percentage (%) basis. This may include materials having, by weight, greater than 50% silicon, as well as those having, by weight, less than 50% silicon, so long as silicon is the single largest constituent of the material. In aspects, the silicon-based electroactive material of the negative electrode 14 may comprise, by weight, greater than or equal to about 50%, optionally about 60%, optionally about 70%, optionally about 80%, or optionally about 90% silicon. Examples of silicon-based electroactive materials include silicon oxide (SiOx), lithium silicon oxide (LiSiOx), lithium silicide (LixSi), and combinations thereof. In aspects, the silicon-based electroactive material of the negative electrode 14 may comprise a composite of silicon and carbon (Si—C), a composite of silicon oxide and carbon (SiOx-C), or a combination thereof. In aspects, the electroactive material of the negative electrode 14 may comprise, by weight, greater than or equal to about 1%, optionally about 5%, optionally about 10%, or optionally about 20% to less than or equal to about 90%, optionally about 50%, or optionally about 30% silicon. In aspects, the electroactive material of the negative electrode 14 may comprise, by weight, about 5.5% $SiO_2$.

In addition to the silicon-based electroactive material, the negative electrode 14 may comprise one or more of graphite, tin, tin oxide, aluminum, bismuth, antimony, indium, zinc, germanium, germanium oxide, titanium oxide, and/or lithium as an electroactive material. In aspects, the electroactive material of the negative electrode 14 may comprise, by weight, greater than or equal to about 10%, optionally about 20%, optionally about 40%, or optionally about 50% to less than or equal to about 95%, optionally about 90%, optionally about 80%, or optionally about 70% graphite. In aspects, the electroactive material of the negative electrode 14 may comprise, by weight, about 94.5% graphite.

Like the electroactive material of the positive electrode 12, the electroactive material of the negative electrode 14 may be a particulate material and particles of the electroactive material of the negative electrode 14 may be intermingled with a polymer binder and/or particles of an electrically conductive material. The same polymer binders and/or electrically conductive materials disclosed above with respect to the positive electrode 12 may be used in the negative electrode 14. In aspects, the negative electrode 14 may comprise a polymer binder comprising a mixture of carboxymethyl cellulose and styrene butadiene rubber. The negative electrode 14 may comprise an electrically conductive material comprising carbon black.

The porous separator 16 physically separates and electrically isolates the positive and negative electrodes 12, 14 from each other while permitting lithium ions to pass therethrough. The porous separator 16 exhibits an open microporous structure and may comprise an organic and/or inorganic material that can physically separate and electrically insulate the positive and negative electrodes 12, 14 from each other while permitting the free flow of ions therebetween. For example, the porous separator 16 may comprise a non-woven material, e.g., a manufactured sheet, web, or mat of directionally or randomly oriented fibers. As another example, the porous separator 16 may comprise a microporous membrane or film. The non-woven material and/or the microporous membrane of the porous separator 16 may comprise a polymeric material. For example, the porous separator 16 may comprise a polyolefin-based material having the general formula $(CH_2CH_R)_n$, where R is an alkyl group. In aspects, the porous separator 16 may comprise a single polyolefin or a combination of polyolefins. Examples of polyolefins include polyethylene (PE), polypropylene (PP), polyamide (PA), poly(tetrafluoroethylene) (PTFE), polyvinylidene fluoride (PVdF), poly(vinyl chloride) (PVC), and/or polyacetylene. Examples of other polymeric materials that may be included in or used to form the porous separator 16 include cellulose, polyimide, copolymers of polyolefins and polyimides, poly(lithium 4-styrenesulfonate)-coated polyethylene, polyetherimide (PEI), bisphenol-acetone diphthalic anhydride (BPADA), para-phenylenediamine, poly(m-phenylene isophthalamide) (PMIA), and/or expanded polytetrafluoroethylene reinforced polyvinylidenefluoride-hexafluoropropylene. In one form, the porous separator 16 may comprise a laminate of two, three, or more layers of microporous polymeric materials, e.g., a laminate of PP-PE or a laminate of PP-PE-PP. In one form, the porous separator 16 may comprise a nanofibrous sandwich structure of PVdF-PMIA-PVdF. In aspects, the porous separator 16 may include a ceramic coating layer and/or a heat-resistant material coating. The ceramic coating layer may comprise alumina ($Al_2O_3$) and/or silica ($SiO_2$). The heat-resistant material coating may comprise Nomex® and/or Aramid.

The electrolyte 18 provides a medium for the conduction of lithium ions through the electrochemical cell 10 between the positive and negative electrodes 12, 14 and is formulated to provide the electrochemical cell 10 with enhanced cycling stability. For example, the electrolyte 18 may be formulated to promote the formation of the first interphase layer 22 and/or the second interphase layer 26 during initial charge and cycling of the electrochemical cell 10. The electrolyte 18 may comprise an organic solvent, a lithium salt, an additive comprising a chemical compound having a phosphorus, oxygen, and silicon bond (P—O—Si bond) (POS additive), and optionally one or more carbonate additives.

The organic solvent may comprise a nonaqueous aprotic organic carbonate or a mixture of nonaqueous aprotic organic carbonates. In aspects, the organic solvent may comprise a mixture of a cyclic carbonate and a linear carbonate. Examples of cyclic carbonates include ethylene carbonate (EC), propylene carbonate (PC), and combinations thereof. Examples of linear carbonates include dimethyl carbonate (DMC), diethyl carbonate (DEC), ethylmethylcarbonate (EMC), and combinations thereof. The organic solvent may constitute, by weight, greater than or equal to about 70% to less than or equal to about 90% of the electrolyte 18.

In aspects, the organic solvent may comprise a mixture of ethylene carbonate and dimethyl carbonate. The volumetric ratio of ethylene carbonate to dimethyl carbonate in the organic solvent may be greater than or equal to about 2 to 8 to less than or equal to about 4 to 6. In aspects, the volumetric ratio of ethylene carbonate to dimethyl carbonate in the organic solvent may be about 3:7. The ethylene carbonate may constitute, by weight, greater than or equal to about 20% or optionally about 25% to less than or equal to about 40% or optionally about 35% of the electrolyte 18. In aspects, the ethylene carbonate may constitute, by weight, about 30% of the electrolyte 18. The dimethyl carbonate may constitute, by weight, greater than or equal to about 45% or optionally about 50% to less than or equal to about 70%, optionally about 65%, or optionally about 60% of the electrolyte 18. In aspects, the dimethyl carbonate may constitute, by weight, about 55% of the electrolyte 18.

The lithium salt is soluble in the organic solvent and provides a passage for lithium ions through the electrolyte 18. The lithium salt may comprise an inorganic lithium salt, an organic lithium salt, or a combination thereof. Examples of inorganic lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. Examples of inorganic lithium salts include lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), and combinations thereof. The lithium salt may be dissolved in the organic solvent at a concentration of greater than or equal to about 0.5 Molar to less than or equal to about 1.5 Molar. In aspects, the lithium salt may be dissolved in the organic solvent at a concentration of about 1 Molar. The lithium salt may constitute, by weight, greater than or equal to about 5%, optionally about 8%, or optionally about 10% to less than or equal to about 20%, optionally about 15%, or optionally about 12% of the electrolyte 18. In aspects, the lithium salt may constitute, by weight, about 11% of the electrolyte 18. In aspects, the lithium salt may comprise $LiPF_6$.

The POS additive may be formulated to promote and/or participate in the formation of the first interphase layer 22 and/or the second interphase layer 26 during initial charge and/or cycling of the electrochemical cell 10. The POS additive may comprise a trialkylsilyl ester of an acid of phosphorus (a trialkylsilyl phosphorus ester). For example, the POS additive may comprise a trialkylsilyl ester of phosphoric acid [$P(=O)(OH)_3$], polyphosphoric acid [$HO(-P(=O)(OH)-O-)_nH$], phosphonic acid [$H-P(=O)(OH)_2$], phosphorous acid [$P(OH)_3$], or a combination thereof. An ester is a compound derived from an acid in which the hydrogen atom (H) of at least one acidic hydroxyl (—OH) group in the acid is replaced by an organyl group. The trialkylsilyl esters of the present disclosure are compounds derived from phosphoric acid, polyphosphoric acid, phosphonic acid, and/or phosphorous acid in which one or more of the acidic hydroxyl groups of the acid are replaced with a trialkylsilyl group ($-Si-R_3$).

In aspects where the POS additive comprises a trialkylsilyl ester of phosphoric acid, phosphonic acid, and/or phosphorous acid, the POS additive may comprise a trialkylsilyl phosphorus ester represented by the formula (1):

$$X_a-P(=O)_b(OZ)_c, \quad (1)$$

where X is hydrogen (H) or an alkyl group (e.g., a methyl group ($-CH_3$)), Z is an trialkylsilyl group ($-Si-R_3$), where R is an alkyl group, a is zero or 1, b is zero or 1, and c is 2 or 3. When c is 2, a=1 and b=1. When c is 3, a=0 and b=0 or 1. In aspects, R may be a methyl group ($-CH_3$) and Z may be a trimethylsilyl group ($-Si-(CH_3)_3$).

For example, the POS additive may comprise a trialkylsilyl ester of phosphorous acid (i.e., a trialkylsilyl phosphite ester). In such case, the POS additive may comprise a trialkylsilyl phosphorus ester represented by formula (1), where a=0, b=0, c=3, and Z is a trialkylsilyl group. In aspects, Z may be a trimethylsilyl group ($-Si-(CH_3)_3$) and the POS additive may comprise tris(trimethylsilyl)phosphite (TTMSP), CAS No. 1795-31-9.

As another example, the POS additive may comprise a trialkylsilyl ester of phosphoric acid (i.e., a trialkylsilyl phosphate ester). In such case, the POS additive may comprise a trialkylsilyl phosphorus ester represented by formula (1), where a=0, b=1, c=3, and Z is a trialkylsilyl group. In aspects, Z may be a trimethylsilyl group ($-Si-(CH_3)_3$) and the POS additive may comprise tris(trimethylsilyl)phosphate, CAS No. 10497-05-9.

As another example, the POS additive may comprise a trialkylsilyl ester of phosphonic acid (i.e., a trialkylsilyl phosphonate ester). In such case, the POS additive may comprise a trialkylsilyl phosphorus ester represented by formula (1), where a=1, b=1, c=2, X=hydrogen, and Z is a trialkylsilyl. In aspects, Z may be a trimethylsilyl group (—Si—$(CH_3)_3$) and the POS additive may comprise bis (trimethylsilyl) phosphite (a.k.a. bis(trimethylsilyl) phosphonate), CAS No. 3663-52-3.

In aspects where the POS additive comprises a trialkylsilyl ester of polyphosphoric acid (i.e., a trialkylsilyl polyphosphate ester), the POS additive may comprise a trialkylsilyl phosphorus ester represented by the formula (2):

$$Z—O(—P(=O)(OZ)—O—)_nZ, \quad (2)$$

where Z is an alkylsilyl group (—Si—$R_3$), R is an alkyl group, and n is 2 or more.

For example, the POS additive may comprise a trialkylsilyl ester of polyphosphoric acid (i.e., a trialkylsilyl polyphosphate ester). In such case, the POS additive may comprise a trialkylsilyl phosphorus ester represented by formula (2), where Z is a trialkylsilyl. In aspects, Z may be a trimethylsilyl group (—Si—$(CH_3)_3$) and the POS additive may comprise trimethylsilyl polyphosphate, CAS No. 40623-46-9.

The POS additive may constitute, by weight, greater than or equal to about 0.2% or optionally about 0.5% to less than or equal to about 1.5% or optionally about 1% of the electrolyte 18. In aspects, the POS additive may constitute, by weight, about 1% of the electrolyte 18.

The first interphase layer 22 and the second interphase layer 26 may be respectively formed on the major surface 28 of the positive electrode 12 and on the major surface 30 of the negative electrode 14 during initial charge and/or cycling of the electrochemical cell 10 due to chemical reactions between the electrolyte 18 and the positive and negative electrodes 12, 14. In FIG. 1, the first interphase layer 22 is disposed along the interface between the positive electrode 12 and the porous separator 16 and the second interphase layer 26 is disposed along the interface between the negative electrode 14 and the porous separator 16. The first and second interphase layers 22, 26 may inherently form in situ respectively along the major surfaces 28, 30 of the positive and negative electrodes 12, 14, for example, during initial charge of the electrochemical cell 10. Portions of the first and second interphase layers 22, 26 may inherently form in situ respectively along the major surfaces 28, 30 of the positive and negative electrodes 12, 14 during cycling of the electrochemical cell 10.

Without intending to be bound by theory, it is believed that the first interphase layer 22 may inherently form in situ on the major surface 28 of the positive electrode 12 during cycling of the electrochemical cell 10, for example, via the electrochemical oxidation of the POS additive in the electrolyte 18 at the major surface 28 of the positive electrode 12. In addition, it is believed that the POS additive may act as a sacrificial component of the electrolyte 18 and may be preferentially oxidized on the major surface 28 of the positive electrode 12, instead of the other components of the electrolyte 18 (e.g., the organic solvent and/or the lithium salt), which may help prevent further degradation of the electrolyte 18. In turn, the preferential oxidation of the POS additive, instead of the other components of the electrolyte 18, may allow the electrochemical cell 10 to effectively and efficiently operate at a relatively high potential, as compared to electrochemical cells that do not include the POS additive. Furthermore, formation of the first interphase layer 22 on the major surface 28 of the positive electrode 12 may protect the positive electrode 12, for example, by preventing chemical reactions from occurring between the positive electrode 12 and the electrolyte 18 during cycling of the electrochemical cell 10. In particular, formation of the first interphase layer 22 on the major surface 28 of the positive electrode 12 may help prevent degradation of the positive electrode 12 caused by transition metal ion dissolution therefrom, thereby improving the cycle life of the electrochemical cell 10. In aspects, the first interphase layer 22 may comprise byproducts of the electrochemical oxidation of the POS additive of the electrolyte 18, which may occur during charge of the electrochemical cell 10. Examples of such electrochemical oxidation products may include chemical compounds having a phosphorus, oxygen, and silicon bond (P—O—Si bond), a phosphorus and oxygen bond (P—O bond), and/or a phosphorus, oxygen, and fluorine bond (P—O—F bond).

Without intending to be bound by theory, it is believed that the second interphase layer 26 may inherently form in situ on the major surface 30 of the negative electrode 14 during cycling of the electrochemical cell 10, for example, via synergistic interactions between the POS additive and the organic solvent and/or one or more chemical compounds derived from decomposition of the organic solvent, e.g., of the ethylene carbonate. For example, without intending to be bound by theory, it is believed that, during cycling of the electrochemical cell 10, the ethylene carbonate may be electrochemically reduced on the major surface 30 of the negative electrode 14 forming one or more alkoxy groups (—OR), e.g., one or more methoxy groups (—$OCH_3$). In turn, the alkoxy groups formed along the major surface 30 of the negative electrode 14 may react with the POS additive in the electrolyte 18 and deposit on the major surface 30 of the negative electrode 14, thereby forming the second interphase layer 26. In aspects, the second interphase layer 26 may comprise byproducts of chemical reactions between the POS additive and one or more decomposition products of ethylene carbonate. Examples of such reaction byproducts may include chemical compounds having a phosphorus, oxygen, and silicon bond (P—O—Si bond), a phosphorus and oxygen bond (P—O bond), a silicon and oxygen bond (Si—O bond), and/or a silicon, oxygen, and carbon bond (Si—O—C bond).

The first and second interphase layers 22, 26 may be electrically insulating and ionically conductive and may help prevent undesirable chemical reactions from occurring between the electrolyte 18 and the respective positive and negative electrodes 12, 14 after initial charging of the electrochemical cell 10. For example, after the first and second interphase layers 22, 26 are formed respectively along the major surfaces 28, 30 of the positive and negative electrodes 12, 14, the first and second interphase layers 22, 26 may help prevent further chemical reactions from occurring between the electrolyte 18 and the positive and negative electrodes 12, 14 during subsequent charge and/or discharge of the electrochemical cell 10. Without intending to be bound by theory, it is believed that formation of the first and second interphase layers 22, 26 may help prevent undesirable chemical reactions from occurring between the electrolyte 18 and the respective positive and negative electrodes 12, 14, without impeding the flow of lithium ions between the electrolyte 18 and the positive and negative electrodes 12, 14.

The optional one or more carbonate additives may be formulated to assist in the formation and stabilization of the first interphase layer 22 and/or the second interphase layer 26 during initial charge and/or cycling of the electrochemical cell 10. In aspects, the one or more carbonate additives may comprise fluoroethylene carbonate (FEC), vinylene carbonate (VC), or a combination thereof. The fluoroethylene carbonate may constitute, by weight, greater than or equal to about 1% to less than or equal to about 3% of the electrolyte 18. In aspects, the fluoroethylene carbonate may constitute, by weight, about 2% of the electrolyte 18. The vinylene carbonate may constitute, by weight, greater than or equal to about 0.5% to less than or equal to about 1.5% of the electrolyte 18. In aspects, the vinylene carbonate may constitute, by weight, about 1% of the electrolyte 18.

Without intending to be bound by theory, it is believed that including fluoroethylene carbonate and/or vinylene carbonate in the electrolyte 18 along with the POS additive may have an additive effect on formation of the first interphase layer 22 and the second interphase layer 26. For example, during cycling of the electrochemical cell 10, the fluoroethylene carbonate and/or vinylene carbonate in the electrolyte 18 may react or interact with the positive electrode 12 and/or the negative electrode 14 to form reaction products that are incorporated into the first and second interphase layers 22, 26, thereby assisting in formation of the first and second interphase layers 22, 26.

Without intending to be bound by theory, it is believed that including fluoroethylene carbonate and/or vinylene carbonate in the electrolyte 18 along with the POS additive may help improve the capacity retention of the electrochemical cell 10, for example, by stabilizing and/or maintaining the physical integrity of the first and second interphase layers 22, 26. The inventors of the present disclosure performed cyclic voltammetry testing on electrochemical cells including different electrolyte formulations. All electrochemical cells included a negative electrode consisting of: an electroactive material including a mixture of graphite and 5.5 wt. % silicon, electrically conductive particles of CB, and a CMC/SBR polymer binder. All electrochemical cells included a positive electrode consisting of: an electroactive material consisting of NCMA, electrically conductive particles of CNT, CB, and GNP, and a PVDF polymer binder having a theoretical capacity of about 5 milliampere hours per square centimeter ($mAh/cm^2$). All electrochemical cells included a base electrolyte composition consisting of: 1 Molar $LiPF_6$ in a mixture of EC and DMC (EC:DMC=3:7 vol/vol). Electrochemical cells including an electrolyte that included, in addition to the base electrolyte composition, 1 wt. % TTMSP exhibited higher areal capacity and higher capacity retention than electrochemical cells including the base electrolyte composition alone. In addition, electrochemical cells including the base electrolyte composition, 1 wt. % TTMSP, 2 wt. % FEC, and 2 wt. % VC exhibited higher capacity retention than electrochemical cells including the base electrolyte composition with 1 wt. % TTMSP. This indicates that FEC and/or VC may work synergistically with TTMSP in the electrolyte 18 to improve the capacity retention of the electrochemical cell 10.

The positive and negative electrode current collectors 20, 24 are electrically conductive and provide an electrical connection between the external circuit 34 and their respective positive and negative electrodes 12, 14. In aspects, the positive and negative electrode current collectors 20, 24 may be in the form of nonporous metal foils, perforated metal foils, porous metal meshes, or a combination thereof. The negative electrode current collector 24 may be made of copper, nickel, or alloys thereof, stainless steel, or other appropriate electrically conductive material. The positive electrode current collector 20 may be made of aluminum (Al) or another appropriate electrically conductive material.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification are to be understood as being modified in all instances by the term "about" whether or not "about" actually appears before the numerical value. Numerical values of parameters in the appended claims are to be understood as being modified by the term "about" only when such term appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. When a composition or material is referred to as being "substantially free" of a substance, the composition or material may comprise, by weight, less than 5%, optionally less than 3%, optionally less than 1%, or optionally less than 0.1% of the substance.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element.

What is claimed is:

1. An electrolyte for an electrochemical cell that cycles lithium ions, the electrolyte consisting of:

an organic solvent consisting of a mixture of at least one cyclic carbonate and at least one linear carbonate;

an inorganic lithium salt in the organic solvent;

fluoroethylene carbonate;

vinylene carbonate; and

≥0.2% and ≤1.5%, by weight, of an additive that is a chemical compound having a phosphorus, oxygen, and silicon bond (POS additive), the POS additive consisting of at least one trialkylsilyl phosphorus ester having the formula $X_a—P(=O)_b(OZ)_c$, where:

X is hydrogen (H) or an alkyl group,

Z is a trialkylsilyl group ($—Si—R_3$), where R is an alkyl group, a is zero or 1, b is zero or 1, c is 2 or 3, when c is 2, a=1 and b=1, and when c is 3, a=0 and b=0 or 1.

2. The electrolyte of claim 1, wherein the POS additive consists of tris(trimethylsilyl) phosphite, tris(trimethylsilyl) phosphate, bis(trimethylsilyl) phosphite, trimethylsilyl polyphosphate, or a combination thereof.

3. The electrolyte of claim 1, wherein the organic solvent consists of a mixture of ethylene carbonate and dimethyl carbonate.

4. The electrolyte of claim 3, wherein the ethylene carbonate and the dimethyl carbonate comprise, by weight, greater than or equal to about 70% to less than or equal to about 90% of the electrolyte, and wherein a ratio of the ethylene carbonate to the dimethyl carbonate (EC:DMC) in the organic solvent is in a range from 2:8 to 4:6.

5. The electrolyte of claim 4, wherein the inorganic lithium salt consists of lithium hexafluorophosphate, wherein the inorganic lithium salt constitutes, by weight, greater than or equal to about 5% to less than or equal to about 20% of the electrolyte.

6. The electrolyte of claim 5, wherein the fluoroethylene carbonate constitutes, by weight, greater than or equal to about 1% to less than or equal to about 3% of the electrolyte and the vinylene carbonate constitutes, by weight, greater than or equal to about 0.5% to less than or equal to about 1.5% of the electrolyte.

7. An electrochemical cell that cycles lithium ions, the electrochemical cell comprising:

a positive electrode comprising a nickel-based electroactive material;

a negative electrode comprising a silicon-based electroactive active material;

a porous separator sandwiched between the positive electrode and the negative electrode; and an electrolyte infiltrating at least one of the positive electrode, the negative electrode, and the porous separator, the electrolyte consisting of:

an organic solvent consisting of a mixture of at least one cyclic carbonate and at least one linear carbonate;

an inorganic lithium salt in the organic solvent;

fluoroethylene carbonate;

vinylene carbonate; and

≥0.2% and ≤1.5%, by weight, of an additive that is a chemical compound having a phosphorus, oxygen, and silicon bond (POS additive), the POS additive consisting of a trialkylsilyl phosphorus ester having the formula $X_a—P(=O)_b(OZ)_c$, where:

X is hydrogen (H) or an alkyl group,

Z is a trialkylsilyl group ($—Si—R_3$), where R is an alkyl group, a is zero or 1, b is zero or 1, c is 2 or 3, when c is 2, a=1 and b=1, and when c is 3, a=0 and b=0 or 1.

8. The electrochemical cell of claim 7, wherein the POS additive consists of tris(trimethylsilyl) phosphite, tris(trimethylsilyl) phosphate, bis(trimethylsilyl) phosphite, trimethylsilyl polyphosphate, or a combination thereof.

9. The electrochemical cell of claim 8, further comprising:

a first interphase layer disposed on a major surface of the positive electrode; and a second interphase layer disposed on a major surface of the negative electrode, wherein the first interphase layer and the second interphase layer are respectively formed in situ on the major surfaces of the positive electrode and the negative electrode during cycling of the electrochemical cell, wherein the first interphase layer and the second interphase layer each comprise a chemical compound having a phosphorus, oxygen, and silicon bond (P—O—Si bond), and wherein electrochemical oxidation of the POS additive occurs at the positive electrode during charge of the electrochemical cell, and wherein the first interphase layer comprises byproducts of the electrochemical oxidation of the POS additive.

10. The electrochemical cell of claim 9, wherein the organic solvent consists of a mixture of ethylene carbonate and dimethyl carbonate.

11. The electrochemical cell of claim 10, wherein intermediate chemical compounds are formed within the electrochemical cell via electrochemical reduction of the ethylene carbonate at the negative electrode during cycling of the electrochemical cell, and wherein the second interphase layer comprises byproducts of chemical reactions between the intermediate chemical compounds and the POS additive.

12. The electrochemical cell of claim 11, wherein the ethylene carbonate and the dimethyl carbonate comprise, by weight, greater than or equal to about 70% to less than or equal to about 90% of the electrolyte, and wherein a ratio of the ethylene carbonate to the dimethyl carbonate (EC:DMC) in the organic solvent is in a range from 2:8 to 4:6.

13. The electrochemical cell of claim 12, wherein the inorganic lithium salt consists of lithium hexafluorophosphate, and wherein the inorganic lithium salt constitutes, by weight, greater than or equal to about 5% to less than or equal to about 20% of the electrolyte.

14. The electrochemical cell of claim 13, wherein the nickel-based electroactive material comprises lithium nickel cobalt manganese aluminum oxide, lithium nickel manganese cobalt oxide, lithium nickel cobalt aluminum oxide, or a combination thereof, and wherein the positive electrode comprises, by weight, greater than 80% nickel.

15. The electrochemical cell of claim 14, wherein the silicon-based electroactive material comprises silicon, silicon oxide, lithium silicon oxide, or a combination thereof, and wherein the negative electrode comprises, by weight, greater than 5% silicon.

16. The electrochemical cell of claim 15, wherein the fluoroethylene carbonate constitutes, by weight, greater than or equal to about 1% to less than or equal to about 3% of the electrolyte and the vinylene carbonate constitutes, by weight, greater than or equal to about 0.5% to less than or equal to about 1.5% of the electrolyte.

17. The electrochemical cell of claim 16, wherein the POS additive consists of tris(trimethylsilyl)phosphite.

18. The electrochemical cell of claim 16, wherein the POS additive consists of bis(trimethylsilyl) phosphite.

19. An electrochemical cell that cycles lithium ions, the electrochemical cell comprising:

a positive electrode comprising a nickel-based electroactive material;

a negative electrode comprising a silicon-based electroactive material;

an electrolyte infiltrating at least one of the positive electrode or the negative electrode, the electrolyte consisting of:

an organic solvent consisting of a mixture of ethylene carbonate and dimethyl carbonate;

lithium hexafluorophosphate in the organic solvent at a concentration of about 1 Molar;

about 2%, by weight, fluoroethylene carbonate about 2%, by weight, vinylene carbonate; and about 1%, by weight, of an additive that is a chemical compound having a phosphorus, oxygen, and silicon bond (POS additive), the POS additive consisting of tris(trimethylsilyl)phosphite, tris(trimethylsilyl) phosphate, bis(trimethylsilyl) phosphite, trimethylsilyl polyphosphate, or a combination thereof.

20. The electrochemical cell of claim 19, wherein the POS additive consists of tris(trimethylsilyl)phosphite.

* * * * *